Feb. 7, 1956 — G. K. ENGELHART — 2,733,909
METHOD AND APPARATUS FOR PREHEATING KILN FEEDS
Filed Feb. 14, 1955
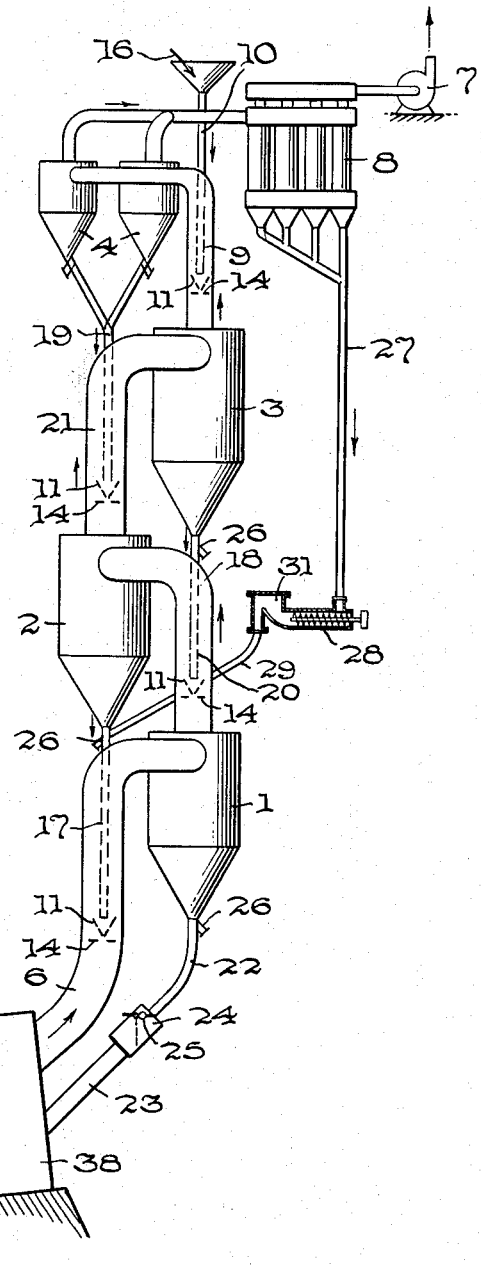
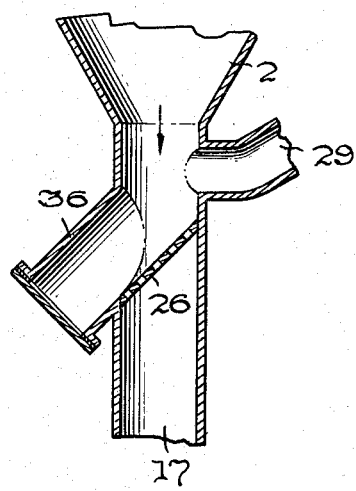
INVENTOR.
GEORGE K. ENGELHART
BY Pennie Edmonds
Morton Barrows & Taylor
ATTORNEYS

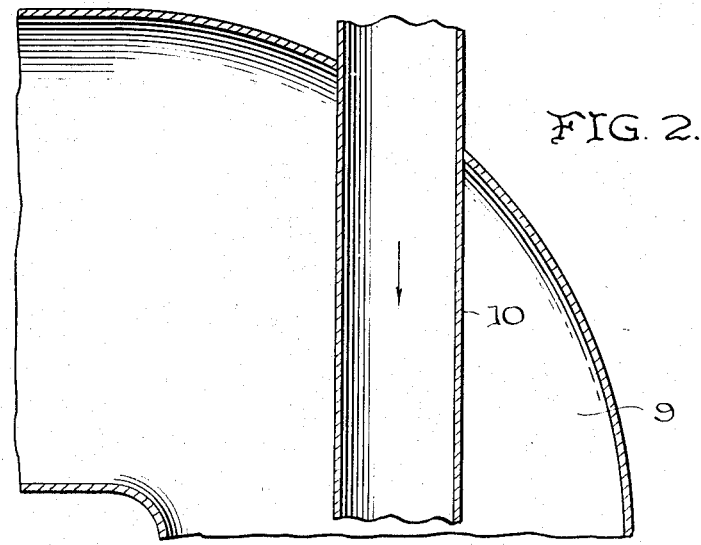
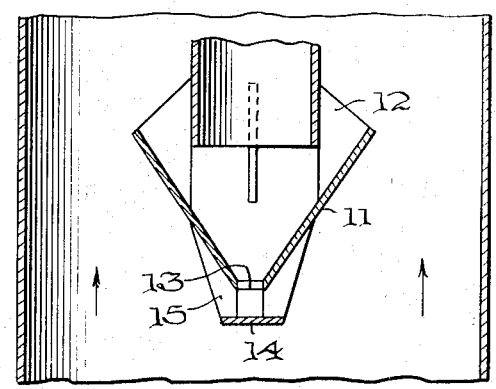
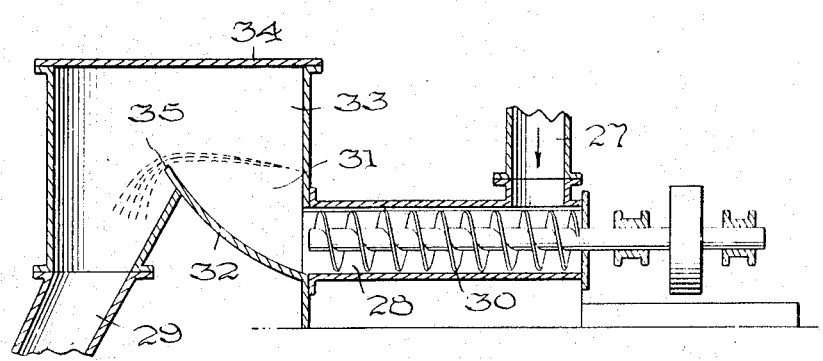

United States Patent Office 2,733,909
Patented Feb. 7, 1956

2,733,909

METHOD AND APPARATUS FOR PREHEATING KILN FEEDS

George K. Engelhart, Catasauqua, Pa., assignor to Fuller Company

Application February 14, 1955, Serial No. 487,809

4 Claims. (Cl. 263—32)

This invention relates to a method and apparatus for preheating kiln feeds and is particularly adapted for preheating raw cement kiln feeds in the manufacture of cement.

The patent to Muller et al. No. 2,663,560 discloses a method and apparatus for the preheating of raw kiln feeds in which the raw feed for the kiln is introduced into the exit gases from the kiln for the extraction of heat directly from the gases. The feed material passes downwardly through a number of serially-interconnected cyclone-type heat exchangers which are designed and function in the manner of rotary-gas-flow dust separators. The gases discharging from the uppermost cyclone heat exchanger passes through a dust collector where the last traces of the finely-divided feed material, or dust, are separated from the gases before they are discharged to the atmosphere. The dust material from the dust collector is added to the feed material discharged from the last, or lowermost, cyclone heat exchanger and the resulting mixture introduced into the kiln as the raw kiln feed.

In a system such as is disclosed in the foresaid patent and briefly described above, the dust material discharged from the dust collector is at a substantially lower temperature than the feed material discharged from the last cyclone heat-exchanger. Hence, the material fed to the kiln and which consists of a mixture of the feed material discharged from the last cyclone heat exchanger and the dust material from the dust collector, will be at a temperature substantially lower than the temperature of the feed material discharged from the last cyclone heat exchanger.

The present invention is directed to a method and apparatus of the character defined in the foresaid patent, but in accordance therewith the relatively cooler dust material from the dust collector is not added directly to the feed material discharged from the last cyclone heat exchanger but is dispersed into the exit gases just after they leave the kiln, when they are at their highest temperature. Thus, the dust material discharged from the dust collector is subjected to direct heat exchange with the hot gases before they are admixed with the discharge from the last cyclone heat exchanger. This results in a more efficient extraction of heat from the exit gases of the kiln, and, further, avoids any reduction of temperature of the feed material discharged from the last cyclone heat exchanger by the addition thereto of a relatively cooler material before it is introduced into the kiln as the raw feed.

While the dust material from the dust collector may be dispersed into the hot exit gases shortly after leaving the kiln in any desired manner, it is preferred that they be added to the feed material discharging from the next-to-the-last cyclone heat exchanger and the resulting mixture then dispersed directly into the hot exit gases leaving the kiln. The hot exit gases carry the mixture of feed and dust material into the last cyclone heat exchanger and the discharge therefrom is fed directly to the kiln as the raw feed.

The invention will be further described in connection with the accompanying drawings which illustrate a preferred embodiment of the invention.

In the drawings:

Fig. 1 shows, more or less diagrammatically, an apparatus for preheating raw feed material by the hot exit gases of a rotary kiln.

Fig. 2 is a cross-sectional view, on a larger scale of one of the portions of the apparatus of Fig. 1 at which material from one of the cyclone heat exchangers is discharged into the gas outlet conduit of another cyclone heat exchanger.

Fig. 3 is a cross-sectional view of a conveyor trap utilized in the apparatus, and Fig. 4 is a cross-sectional view of another portion of the same apparatus illustrating how the finely-divided dust material is added to the feed material discharge of the next-to-the-last cyclone heat exchanger and how foreign bodies may be discharged from the cyclone heat exchangers.

The apparatus illustrated in the drawings is one for the preheating of the raw feed for a rotary cement kiln; and while the invention will be particularly described in connection with such an apparatus, it is to be understood that the invention is not restricted to the preheating of the raw feed of a cement kiln, nor to the preheating of material for the particular type of kiln shown in the drawings.

Referring now to Fig. 1, the illustrated heating apparatus comprises a group of heat exchangers 1, 2, 3 and 4 connected to a rotary kiln 5. Each exchanger consists of a rotary-gas-flow separator (cyclone) to which the gas is supplied tangentially and, hence, is caused to rotate before leaving the vessel through the gas outlet conduit. For better dust separation, the cyclone 4 is composed of two parallel-connected individual cyclone units each of smaller cross section and volume than any of the other cyclones.

The cyclone 1 is connected through a gas conduit 6 with the stationary hood 38 of the kiln. The hot exit gases from the kiln pass through this conduit into the cyclone 1 and thence successively through the cyclones 2, 3 and 4. The gases are exhausted by a blower 7 through a dust separating device 8 disposed at the end of the gas flow path. The device 8 comprises several cyclone units of correspondingly smaller diameters.

The cement raw material is supplied through a hopper 16 whence it passes through a supply pipe 10 into the gas conduit 9 leading from cyclone 3 to cyclone 4. The supply pipe 10 extends axially within the gas conduit 9 along an appreciable portion of this conduit so that the discharge end of the supply pipe is close to the top of the cyclone 3.

As best apparent from Fig. 2, an upwardly flaring funnel structure 11 is mounted below the opening of the supply pipe 10. The funnel 11 is attached to pipe 10 by means of connecting webs 12. Its upper rim is preferably slightly higher than the discharge opening of pipe 10. The funnel 11 has an opening 13 at its bottom, and a disc 14 is disposed below this opening in spaced relation thereto. Disc 14 is fastened to the funnel structure 12 by connecting webs 15.

The raw material drops through pipe 10 into the funnel 11 and, during the operation of the apparatus, keeps the funnel space filled because the opening 13 is relatively small. Consequently, the material flows mainly over the circular upper edge of the funnel. At the same time, a smaller portion of the supply passes through the opening 13 and flows over the circular rim of disc 14 thus entering the ascending gas current in a uniform distribution.

The distance of the disc 14 from the bottom opening 13 of the funnel is sufficiently large to prevent clogging of the material at this point. The filled funnel space forms a gas trap and hence prevents the ascending gas from entering into the supply pipe 10.

The feed material separated within the cyclones 2, 3 and 4 is introduced in the same manner as just explained with reference to Fig. 2 from the feed material discharge pipe 17, 18 and 19 into the respective gas conduits 6, 20 and 21. The feed material separated within the cyclone 1 drains through the discharge pipe 22 into the kiln feed pipe 23 of the rotary kiln. A pendulous flap 24 is interposed between pipes 22 and 23. Flap 24 may be adjusted by levers and a weight 25 so that it has a slight closing moment which is overpowered by the dropping dust. The pendulous flap 24 prevents the entrance of kiln gases into the discharge pipe 22.

The path of travel of the feed material from hopper 16 to the kiln 5 may be traced as follows. The material, passing from hopper 16 through supply pipe 10 into the gas outlet conduit 9 of cyclone 3, is entrained by the upward flow of hot gases and is thus conveyed in suspension to the next higher cyclone 4. In cyclone 4, the material separated from the gases passes through material discharge pipe 19 into the gas outlet conduit 21 of cyclone 2. The upward flow of hot gases in conduit 21 carries the material into cyclone 3 where the material is again separated from the gases to drain through discharge pipe 18 into the upstream of gases within gas outlet conduit 20 of cyclone 1 to be conveyed upwardly into cyclone 2. The material separated from the gases in cyclone 2 then drains through discharge pipe 17 into the gas conduit 6 and is again entrained by the upward flow of gases, thus reaching the lowermost cyclone 1 from which the separated material is admitted to the kiln as described.

It will be recognized that the travelling path of the material, though generally downward in opposition to the upward flow of hot kiln gases, follows a zig-zag course which meanders between the two vertical separator columns, and that the material is alternately conveyed downwardly by gravity and upwardly by suspension within the forced flow of hot gases.

A screening device for eliminating foreign inclusions is preferably provided at the lower end of each cyclone. According to Fig. 4, the screening device comprises a slanted screen 26 across the pertaining material discharge pipe. Adjacent to the screen 26 is a branch stub 36 covered by a lid 37. Larger pieces of material that may be included in the feed material discharge, for instance, pieces of insulating masonry broken off the cyclone walls, are retained on the screen 26 and can be removed by opening the lid 37.

The dust material separated from the gas flow in the final dust separating device 8 passes through a dust discharge pipe 27 into a pressure lock 28 from which it is discharged through a pipe 29 into the feed material discharge pipe 17 leading from the cyclone heat exchanger 2 into the gas conduit 6 extending from the kiln. The pressure lock 28, separately shown in Fig. 3, has a conveyor or feed screw 30 which passes the dust material from the discharge pipe 27 into a trap chamber 31. Chamber 31 is bordered by a curved wall portion 32 of a box 33 closed by a removable cover 34. The dust material conveyed by the screw 30 is trapped at the curved wall 32 and continuously overflows from the trap into the connecting pipe 29. The trap thus forms a gas seal between pipes 29 and 27 which prevents an equalization of the pressure difference existing between them. The trap seal also protects the mechanical parts of the screw 30 from the high temperature obtaining in the lower part of the pipe conduit.

The finely-divided dust material from the dust collecting device 8 on entering the feed material discharge pipe 17, mixes with the feed material discharged from the cyclone heat exchanger and is dispersed directly into the hot exit gases leaving the kiln. Thus, the temperature of the dust material from the dust collector is materially raised and additional heat is extracted from the exit gases as the mixture of material and dust passes upwardly with the hot exit gases and is discharged into the last, or lowermost, cyclone heat exchanger 1. As the dust material from the dust collector passes upwardly through the gas conduit 6 in direct contact with the hot exit gases and is swirled around the cyclone heat exchanger 1 with them, it is brought to a temperature approximating the temperature of the feed material separated in the cyclone heat exchanger 2, and introduced along with it into the cyclone heat exchanger 1. Consequently the combined material discharged from the cyclone heat exchanger 1 and introduced into the kiln 5 as the total raw feed material is at a higher temperature than if the dust material from the dust collecting device were not admixed with the feed material from the cyclone heat exchanger 1 until after its discharge therefrom, and just prior to its introduction into the kiln. As a result, the over-all efficiency of the system is increased.

While the invention has been particularly described in connection with a preferred form of the invention, it will be understood that various changes may be made in the details of the apparatus or the method of operation without departing from the spirit of the invention or sacrificing any of the advantages thereof.

I claim:

1. The method of preheating kiln feed material which comprises passing the feed material serially through a plurality of heat exchangers, bringing the feed material in said heat exchangers in direct contact with the hot exit gases from the kiln while said gases are passing counter-current to the general direction of flow of the feed material, separating the feed material from the hot gases in the several heat exchangers of the series, introducing the feed material separated from the hot gases in the last of the series of heat exchangers into the kiln, separating finely-divided dust material from the discharge gases of the first heat exchanger of the series, adding the separated dust material to pre-heated feed material being discharged from one of the heat exchangers and on its way to a succeeding heat exchanger of the series, completing the mixing of the dust and feed material in said succeeding heat exchanger while subjecting the materials to direct heat exchange with the gases while suspended therein, separating the mixed dust and feed materials from the gases in said succeeding heat exchanger, discharging the mixed dust and feed materials from said succeeding heat exchanger, and conducting into the kiln said discharged mixed dust and feed materials.

2. The method of preheating kiln feed material as defined in claim 1 in which the finely-divided dust material separated from the discharge gases leaving the first of said series of heat exchangers is mixed with the feed material separated from the hot gases in the heat exchanger next preceding the last heat exchanger of the series.

3. Apparatus for preheating kiln feed material which comprises a series of rotary-gas-flow heat exchangers, conduit means for connecting said heat exchangers for the passage of hot gases through them serially, means for introducing kiln feed material to said series of heat exchangers for passage therethrough, conduit means for passing hot exit gases from a kiln to the last heat exchanger of the series, said heat exchangers being so constructed and arranged that the feed material is caused to pass through them generally counter-current to the flow of the hot gases therethrough and in direct contact with said gases, means for separating the feed material from the hot gases in each heat exchanger, means for conducting feed material separated from the hot gases in the last of the series of heat exchangers to a kiln, means for introducing said material separated from each heat exchanger, other than the last heat exchanger of the series, into the conduit which conducts the kiln gases into the next heat exchanger of the series, means for separating finely-divided dust material from the discharge gases leaving the first of said series of heat exchangers, and means for conducting the finely-divided dust material separated from the discharge gases leaving the first of said series of heat exchangers into the gas stream leading to the last of the heat exchangers of the series.

4. Apparatus for preheating kiln feed material as defined in claim 3 including means for mixing the finely-divided dust material separated from the discharge gases leaving the first of said series of heat exchangers with the feed material separated from the hot gases in the heat exchanger preceding the last heat exchanger of the series.

References Cited in the file of this patent
UNITED STATES PATENTS

| | | |
|---|---|---|
| 2,190,234 | Hasselback et al. | Feb. 13, 1940 |
| 2,648,532 | Muller et al. | Aug. 11, 1953 |